United States Patent [19]

Mazurek et al.

[11] Patent Number: 4,491,605

[45] Date of Patent: Jan. 1, 1985

[54] CONDUCTIVE POLYMERS FORMED BY ION IMPLANTATION

[75] Inventors: Harry Mazurek, Wallingford, Pa.; David R. Day; Edward W. Maby, both of Boston, Mass.; Jonathan S. Abel, Sarasota, Fla.

[73] Assignee: Massachusetts Institute of Technology, Cambridge, Mass.

[21] Appl. No.: 391,259

[22] Filed: Jun. 23, 1982

[51] Int. Cl.$^3$ .................................................. C08F 8/22
[52] U.S. Cl. ......................................... 427/38; 427/35; 523/375; 252/500; 525/356
[58] Field of Search .................... 427/35, 38; 523/375; 204/159.14, 159.19, 159.2; 252/500, 512, 513, 514; 525/356, 360

[56] References Cited

U.S. PATENT DOCUMENTS 3,137,633  6/1964  Kline ................................. 204/159.2

OTHER PUBLICATIONS

Weber, J. Chemical Society, Chemical Communications, vol. 11, p. 522, 1981.
Weber, "Ion Implantation Studies on (CH)x", Naval Research Lab Memo, Report 4335, p. 53, 1980.
J. S. Abel, "Electrical Properties of Ion Implanted P-Phenylene Sulfide, 1982.

Primary Examiner—Paul R. Michl
Attorney, Agent, or Firm—Arthur A. Smith, Jr.; Thomas J. Engellenner

[57] ABSTRACT

Conductive materials are formed by implanting high energy ions (30 keV to 300 keV) into rigid backboned polymers, such as poly (p-phenylene sulfide); conductivities on the order of $10^{-3}$ (ohm-cm)$^{-1}$ are demonstrated and the materials remain stable over periods as long as a year.

12 Claims, 3 Drawing Figures

CONDUCTIVE POLYMERS FORMED BY ION IMPLANTATION

The Government has rights in this invention pursuant to Contract Number N00014-77-C-0053 awarded by the U.S. Navy.

TECHNICAL FIELD

This invention relates to conductive polymers and, in particular, to polymers rendered conductive by ion implantation.

BACKGROUND OF THE INVENTION

Attention is directed to an article by the inventors herein and their colleagues entitled "Electrical Properties of Ion-Implanted Poly (P-Phenylene Sulfide)" in the Proceedings of the Materials Research Society Conference (Boston, 1982) and a thesis of one of the inventors, J. S. Abel, of the same title (MIT 1982); both the article and thesis are incorporated herein by reference.

Conductive polymers are highly sought after at the present time to serve as substitutes for metallic and semiconductive materials in a variety of applications conducting electricity. For example, conductive polymers hold promise in batteries, solar cells, integrated circuits and electromagnetic shielding.

Considerable work has been done on a class of rigid backboned polymers that can be chemically doped (i.e. oxidized or reduced by a diffused chemical) and thus rendered conductive. Such polymers for example, include polyacetylene, and the dopants include iodine, arsenic pentafluoride or other similar materials having high electron affinity. Conductivities as high as 1000 (ohm cm)$^{-1}$ have been achieved but problems are encountered which presently preclude commercialization. Typically, the chemical doping treatment which renders the polymer conductive also renders it brittle and intractable. Moreover, the conductive derivatives are unstable under ambient conditions.

Irradiation of polymers has been practiced in the past for reasons unrelated to conductivity efforts. Various U.S. patents and publications have disclosed the use of electron bombardment to cross-link polymers and cure plastics. For example, see Timmerman, U.S. Pat. No. 3,142,629 and Smith, "Radiation Processing of Plastics", *Modern Plastics Encyclopedia* (1965). See also Weber, "A New Method for the Chemical Modifications of Polymers" 1981 *Journal Chemical Society Communications*, p.p. 522–523, wherein halogen ion implanation of polyacetylene is reported to produce color changes and improve stability.

Ionic radiation has also been used in the past on inorganic semiconductors and insulators. Implantation of ions to modify the conductivity of materials such as glasses and metal oxides is taught by Kurtin, U.S. Pat. No. 4,088,799, issued May 9, 1978.

There exists a need for stable conductive polymers which can be produced and processed easily. For complicated integrated circuit applications and the like, there also exists a need for methods and apparatus which can lay down precise conductive paths with carefully controlled conductivity.

SUMMARY OF THE INVENTION

We have discovered that conductive polymers can be formed by implanting ions into polymeric materials. The implantation technique permits the controlled addition of impurities and unlike chemical doping techniques, our polymers do not exhibit decreasing conductivity under ambient conditions. Conductivities on the order of $10^{-3}(\Omega\ cm)^{-1}$ have been obtained in our experiments and maintained over extended periods. It appears that a wide variety of polymers, such as polyacetylene, poly (p-phenylene), poly (p-phenylene vinylene), polythiophene, polypyrrole, poly (1,6-heptadiyne) and poly (p-phenylene sulfide) may be rendered conductive by our invention. Preferred polymers are those having a generally rigid backbone structure.

A variety of ions may also be used in our invention and an additional advantage is that ion implanation can be used to introduce species which cannot be added by chemical means. We have demonstrated that non-metallic ions such as Arsenic, halogen ions such as Bromine and noble element ions such as Krypton may be employed to render polymers conductive.

In another aspect of our invention, ion implantation appears to chemically modify the polymer to make the conductivity more stable. Our stablized polymers may be used alone or in conjunction with chemically doped materials. For example, a polymer may be treated with a chemically diffused dopant then surface-implanted with ions to capture or "lock-in" the conductivity.

In another aspect of our invention conductivity may be controlled by controlling the fluence of the particle beam. By varying the mass of the particles or the energy, the average depth of implanted ions can also be controlled. By rastering the beam, precise conductive paths can be laid down without the need for photolithic masks. Implantations can be achieved with beam energies varying from 30 keV to 300 keV, preferrably from 100 to 200 keV. Ion fluence may vary from about $10^{13}$ to $10^{17}$ ions per square centimeter, preferrably from about $10^{14}$ to $10^{16}$ ions per square centimeter. Of course, when our invention is used to stablize the surface of a chemically doped polymer, beam energy may not be a key parameter; a low energy ion plasma should suffice.

Our invention will next be described in connection with a preferred embodiment. However, it should be clear that various changes and modifications can be made by those skilled in the art without departing from the spirit or scope of the claims. For example, although our examples report results on poly (p-phenylene sulfide), hereinafter "PPS", many other polymers including polyacetylene may be used. Moreover, while the implanted species are positive ions, a high energy neutral atomic beam may also be used. Additionally, other ions besides Group V, VII and VIII ions should suffice for implantation purposes.

DESCRIPTION OF A PREFERRED EMBODIMENT

Figure 1:
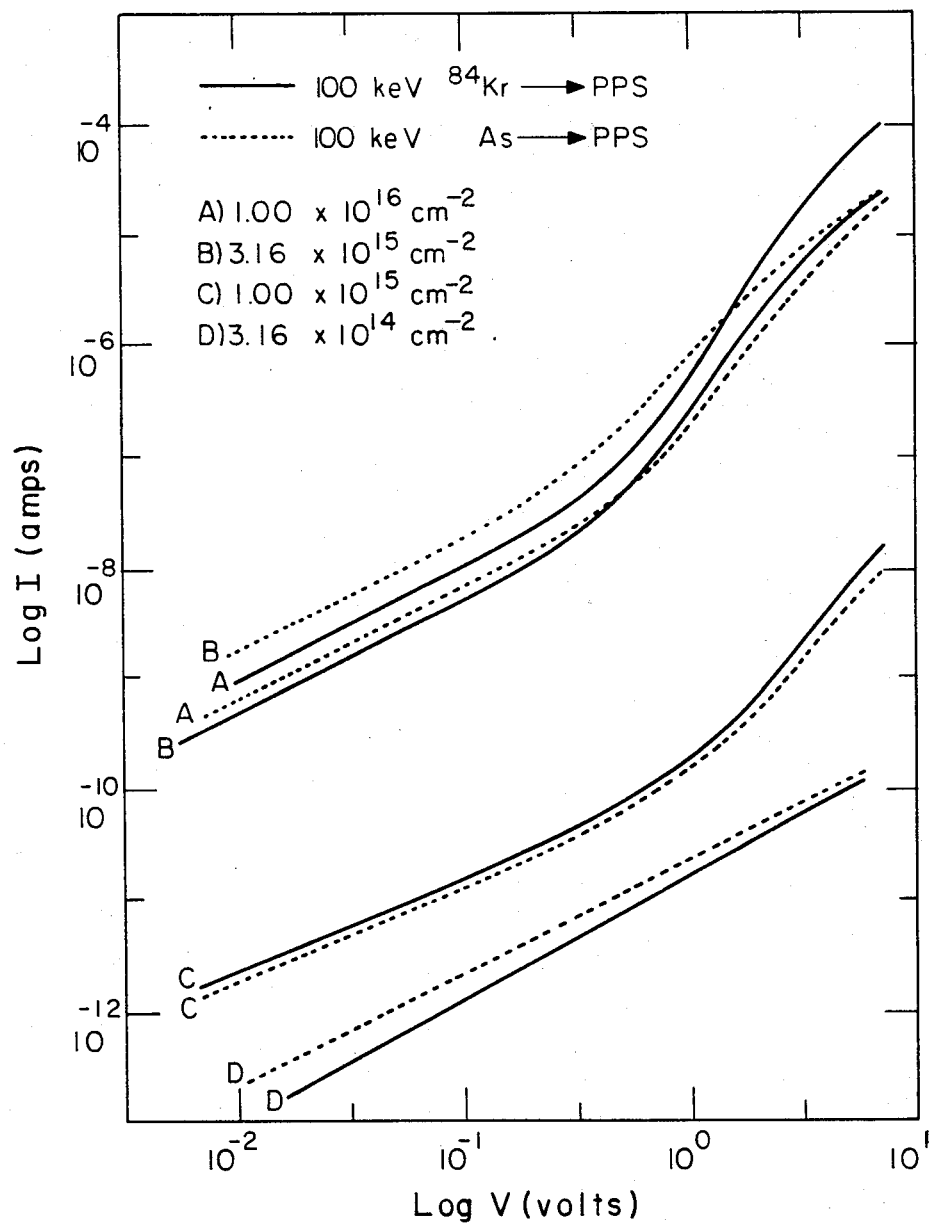
FIG. 1 is a current-voltage graph for Arsenic and Krypton implanted PPS according to our invention.

The invention is described in connection with the following experimental results:

The device used for the conductivity measurements was a pair of interdigitated electrodes consisting of 11 sets of parallel fingers fabricated on a silicon wafer with an insulating layer of oxide between the silicon and the electrodes. The polymer was spun onto the device and was ion implanted, resulting in a conducting layer of width —700 Å between the electrodes. PPS was first dissolved in N-methyl-2-pyrrolidone at 200C using 2 g polymer/50 ml solvent. A wafer with the devices was placed on a heated spinning vacuum chuck. The polymer solution was then poured onto the hot spinning wafer. Since the wafer was spinning, the solution formed a thin film. Also, since the wafer was hot, the PPS did not come out of solution upon contacting the waver; the procedure thus resulted in a smooth film. The solvent was baked out of the film in a vacuum oven at 80 C. for 30 minutes, to complete the deposition process.

Two sets of ion implantation experiments were performed. A first set compared the implantation-induced conductivity changes in PPS films using either $^{75}$As or $^{84}$Kr as the implanted species; the second set made a similar comparison using either $^{80}$Br or $^{84}$Kr as the implanted species. Implantation conditions for each experiment are summarized in Table I. The mean ion penetration depth ($R_p$) and statistical standard deviations ($\Delta R_p$) are presented in Table I for the implanted ion distributions.

TABLE I

| Ion | Ion Implantation Conditions* | | |
|---|---|---|---|
| | Energy (keV) | $R_p$ ($\mu$m) | $\Delta R_p$ ($\mu$m) |
| $^{75}As$ | 100 | 0.080 | 0.020 |
| $^{84}Kr$ | 100 | 0.075 | 0.019 |
| $^{80}Br$ | 200 | 0.151 | 0.040 |

*Implantation fluence varied between $3.2 \times 10^{14}$ cm$^{-2}$ and $3.2 \times 10^{16}$ cm$^{-2}$.

Ion implantation was performed at ambient temperature with the ion beam directed normal to the film. The ion beam current density was less than 0.5 $\mu$A/cm$^2$ in order to minimize target heating.

Room temperature DC measurements of the interelectrode resistance were made by applying voltages between 0.01 and 10 V to the sample and measuring the resulting current with a Keithley 610C electrometer. A shielded enclosure was used for these measurements. For the unimplanted samples, no current above the noise level could be observed. In all implanted samples, current levels were easily detectable.

To test the effects of contact resistance, AC measurements of interelectrode impedance were made using a Hewlett-Packard HP3575A Gain-Phase Meter and an associated operational amplifier circuit designed for this purpose. The frequency range examined was 1–10000 Hz, using sinusoidal voltages with amplitudes less than 1 V. The unimplanted samples behaved like capacitors having values equal to the stray interelectrode capacitance; whereas, for frequencies below 100 Hz, the implanted samples behaved like simple resistors having values equal to the measured DC value.

Typical current-voltage characteristics of Arsenic and Krypton-implanted films are shown in FIG. 1 for each of four ion fluences. At low applied voltages, ohmic behavior is observed with no apparent contact perturbation. For a given applied bias, current levels remain constant over a period of days, thereby eliminating the possibility of an ionic conduction mechanism. Moreover, in contrast to chemically doped polymers, the conductivities of ion implanted PPS films remain stable for periods of several months when exposed to the natural ambient. All samples prepared thus far have retained their initial average conductivity levels. No sample has shown any degradation over the nearly one-year period of our research.

Figure 2:
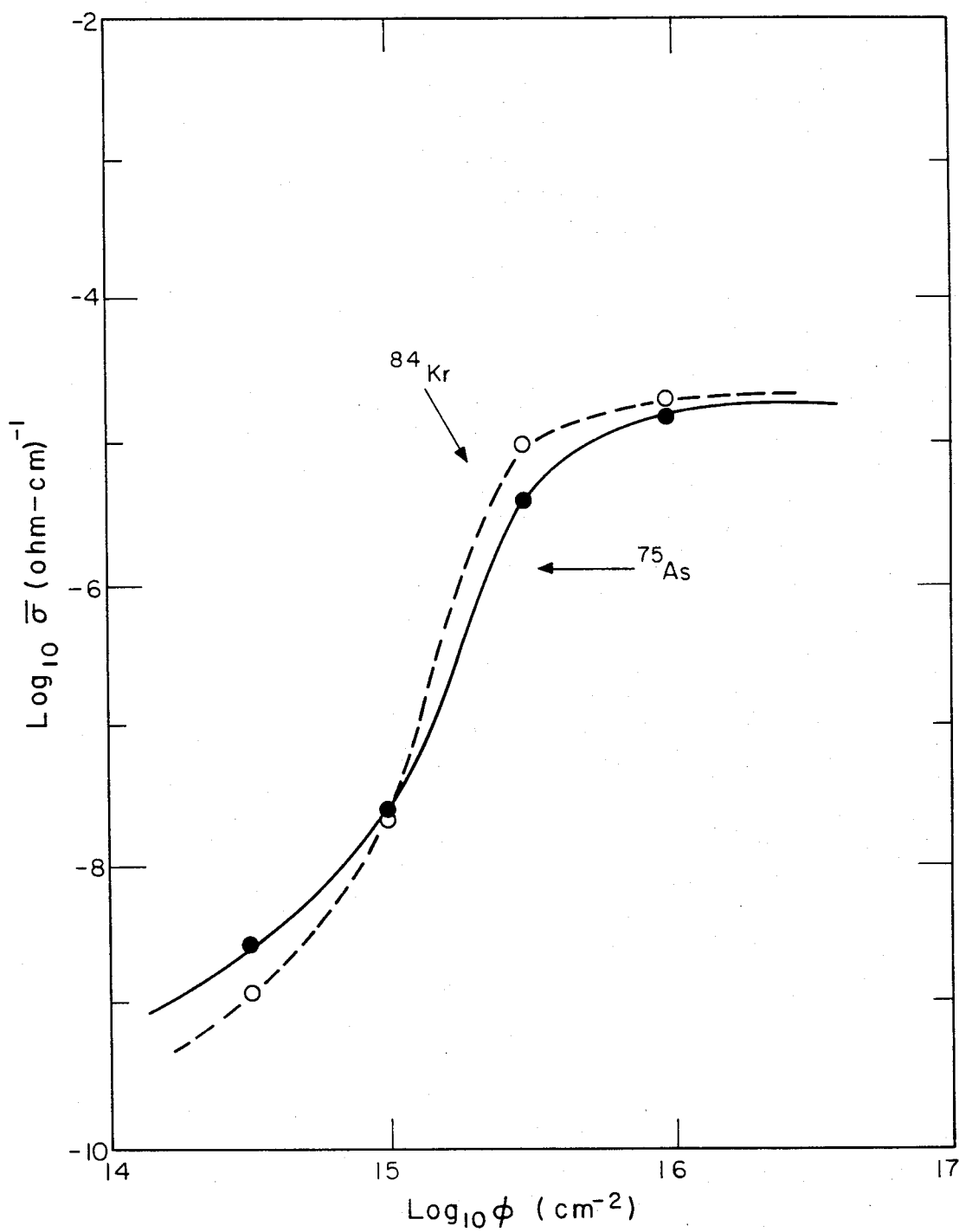
FIG. 2 is a conductivity-fluence graph for Arsenic and Krypton implanted PPS according to our invention.

Average conductivity values within the active region of the implanted layer are plotted as a function of fluence in FIG. 2 using the resistance in the ohmic region as a parameter. Three fluence regimes are evident. At low fluence, the conductivity increases approximately linearly with increasing fluence, at a "critical" intermediate fluence $\phi_c$, the conductivity increases more rapidly than the linear rate and at high fluence, the conductivity appears to become saturated. Most striking is the fact that Krypton, normally inert, can be implanted into PPS films to produce conductivities which are similar to those for samples implanted with similar fluences of the somewhat more reactive Arsenic species.

Conductivity changes which are specifically related to the chemical activity of the ion implanted impurity do not appear to be significant for the particular case of Arsenic-implanted PPS. The Ar-implanted sample with the highest average conductivity value ($o = 3.4 \times 10^{-5}$ (ohm-cm)$^{-1}$ for 100 keV $^{75}$As implanted at a fluence of $3.16 \times 10^{15}$ cm$^{-2}$) corresponds to an average Arsenic concentration of $8 \times 10^{20}$ cm$^{-3}$ within the 0.04 $\mu$m effective thickness of the implanted layer. In contrast, PPS films which have been chemically doped with AsF$_5$ are more conductive by nearly five orders of magnitude for Arsenic concentrations which are greater by only a factor of ten. The chemical and molecular properties of AsF$_5$ appear to be a factor in this comparison.

A second set of experiments was performed in which Bromine was used as the implanted species with the hope of obtaining larger conductivity values in PPS films as a consequence of specific chemical doping. Since the atomic mass of Bromine is close to that of either Arsenic or Krypton, the conductivity changes which are solely due to bombardment-induced disorder are expected to be similar. For atomic mass numbers close to 80, disorder-related conductivity changes become saturated at fluence levels above $1 \times 10^{16}$ cm$^{-2}$. Therefore, a continued conductivity increase as the Bromine fluence is increased above $1 \times 10^{16}$ cm$^{-2}$ is a clear indication of an effective chemical dopant.

Figure 3:
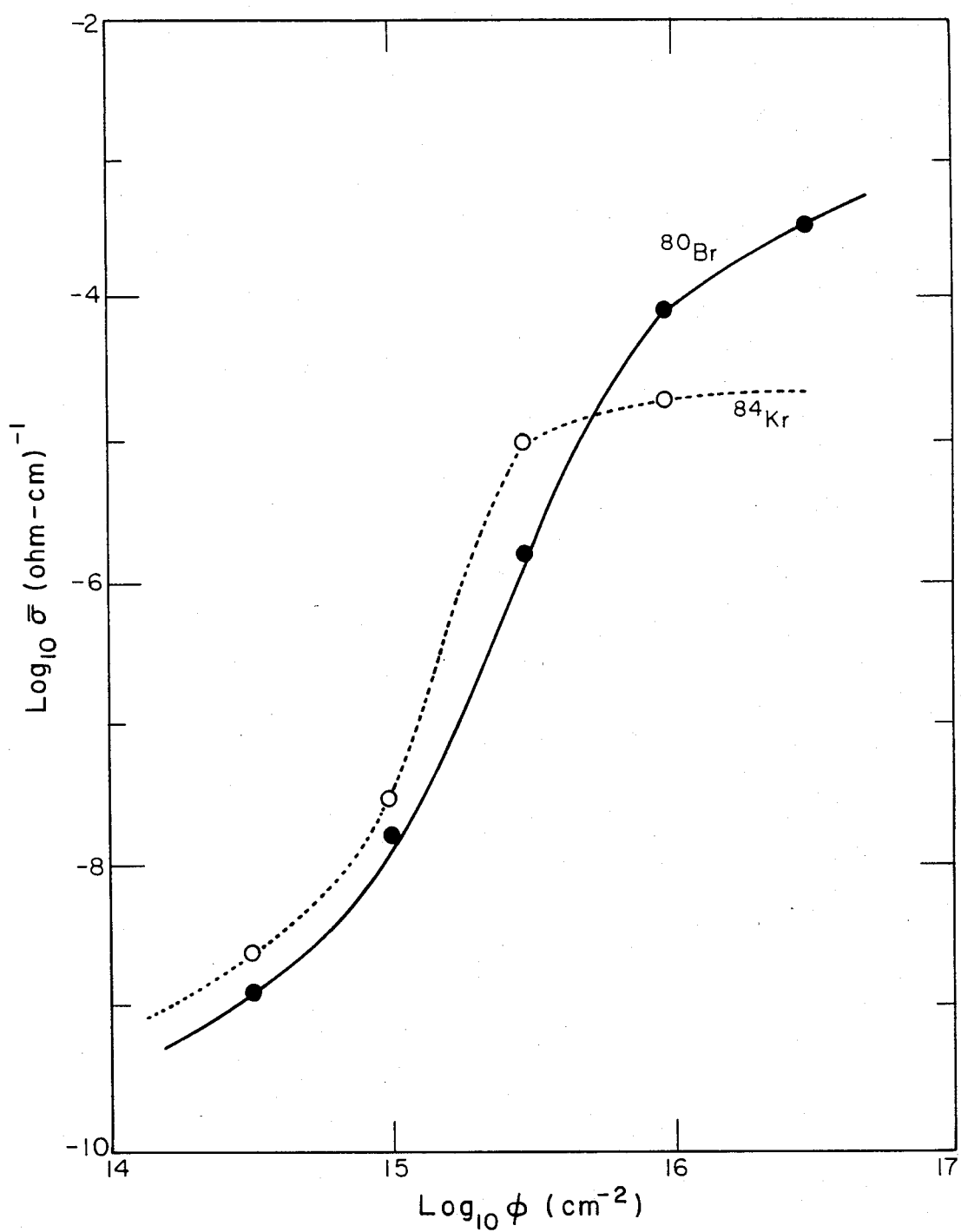
FIG. 3 is a conductivity-fluence graph for Bromine and Krypton implanted PPS according to our invention.

FIG. 3 shows the mean conductivity vs. fluence for the 0.2 $\mu$m thick Bromine-implanted PPS films and similar data for the 0.1 $\mu$m thick Krypton-implanted PPS films (from FIG. 2). The effects of differing film thickness have been taken into account through the judicious choice of implantation energy and the use of the corresponding $\Delta R_p$ value. The behavior at low fluence and intermediate fluence values are similar for either implanted species, indicating the dominance of a disorder-related conductivity increase. However, at high fluence levels (greater than $1 \times 10^{16}$ cm$^{-2}$), the means conductivity of Bromine-implanted PPS continues to rise at a nearly linear rate; whereas, the mean conductivity of Krypton-implanted PPS appears to saturate. This observation suggests that Bromine implantation at high fluence lead to the dominance of specific chemical doping. The largest mean conductivity value measured was $4 \times 10^{-4}$ (ohm-cm)$^{-1}$ and corresponds to a Bromine fluence of $3.16 \times 10^{16}$ cm$^{-2}$. Preliminary experiments in which the other halogens were implanted into PPS films have also shown evidence for chemical doping, particularly for the case of chlorine.

Auger measurements were taken before and after ion implantation to determine the change in stoichiometry of the host species in the film. Auger measurements showed increased carbon and decreased sulfur concentrations near the surface of the polymer film. Electrical measurements taken after sputtering away the carbonaceous surface layer showed that this surface layer did not contribute to the increased conductivity resulting from ion implantation of the polymer.

The same infrared spectra were obtained from the pristine polymer and from the polymer film after it was spun onto the device, indicating that the two were the same material. However, after implanation, the devices exhibited modified IR spectra, indicative of chemical changes associated with the introduction of significant cross-linking by the implantation process.

In summary PPS films which have been ion implanted with either Arsenic or Krypton become increasingly conductive with increased fluence up to levels of about $1 \times 10^{16}$ cm$^{-2}$. At this fluence, the conductivity which results is about $1.5 \times 10^{-5}$ (ohm-cm)$^{-1}$. The effects of Arsenic and Krypton implantation in PPS are similar and suggest, for these particular species, that the conductivity increase is related to implantation-induced molecular rearrangements and cross-linking rather than dopant reactivity. Specific chemical doping may explain, however, the larger conductivities observed for the case of Bromine implanted into PPS films. Unlike the Arsenic or Krypton-implanted samples which show saturation, the Bromine-implanted films exhibit a linear relationship between conductivity and fluence at high fluence levels. Conductivity changes which result following Arsenic, Krypton and halogen implantations are air stable and do not change over periods of several months.

What we claim is:

1. A method of imparting conductivity to a material comprising a rigid backboned polymer, the method comprising bombarding the material with ions from a particle accelerator, the ions having a kinetic energy of about 50 or more KeV.

2. A method of imparting conductivity to a material comprising a rigid backboned polymer, the method comprising bombarding the material with ions from a particle accelerator, the ions having a kinetic energy of about 100 or more KeV.

3. The method of claim 1 wherein the ions are positive ions.

4. The method of claim 1 wherein the method further comprises neutralizing the ions from the particle accelerator to form a neutral beam before bombarding the material.

5. The method of claim 1 wherein the step of implanting further comprises bombarding the material with a particle beam having a fluence ranging from about $10^{13}$ to about $10^{17}$ particles per square centimeter.

6. The method of claim 1 wherein the step of implanting further comprises bombarding the material with a particle beam having a fluence ranging from about $10^{14}$ to about $10^{16}$ particles per square centimeter.

7. The method of claim 1 wherein the polymer is at least one polymer chosen from the group of polyacetylene, poly (p-phenylene), poly (p-phenylene vinylene), polythiophene, polypyrrole, poly (1,6-heptadiyne) and poly (p-phenylene sulfide).

8. The method of claim 7 wherein the polymer is poly (p-phenylene sulfide).

9. The method of claim 1 wherein the ions essentially comprise bromine ions.

10. The method of claim 1 wherein the ions essentially comprise chlorine ions.

11. The method of claim 1 wherein the ions essentially comprise krypton ions.

12. The method of claim 1 wherein the ions essentially comprise arsenic ions.

* * * * *